United States Patent [19]
Inouye

[11] 3,867,137
[45] Feb. 18, 1975

[54] PURIFICATION OF IRIDIUM
[75] Inventor: Henry Inouye, Oak Ridge, Tenn.
[73] Assignee: The United States of America as represented by the United States Atomic Energy Commission, Washington, D.C.
[22] Filed: June 22, 1973
[21] Appl. No.: 372,886

[52] U.S. Cl. .................................................. 75/83
[51] Int. Cl. ............................................ C22b 11/02
[58] Field of Search .............. 75/83, 62, 63; 423/22

[56] References Cited
UNITED STATES PATENTS
3,348,942  10/1967  Davenport ............................ 75/63
FOREIGN PATENTS OR APPLICATIONS
1,591,465  6/1970  France .................................. 75/83
640,577  7/1950  Great Britain ....................... 423/22

OTHER PUBLICATIONS
Schafer et al., 54 24078i, Chem. Abstracts, 1960, QD1A51.

Primary Examiner—L. Dewayne Rutledge
Assistant Examiner—M. J. Andrews
Attorney, Agent, or Firm—John A. Horan; David S. Zachry; John B. Hardaway

[57] ABSTRACT

A process for purifying iridium metal by oxidizing impure iridium metal to form volatile $IrO_3$, condensing the $IrO_3$ as $IrO_2$ and reducing the $IrO_2$ back to substantially pure iridium.

8 Claims, 1 Drawing Figure

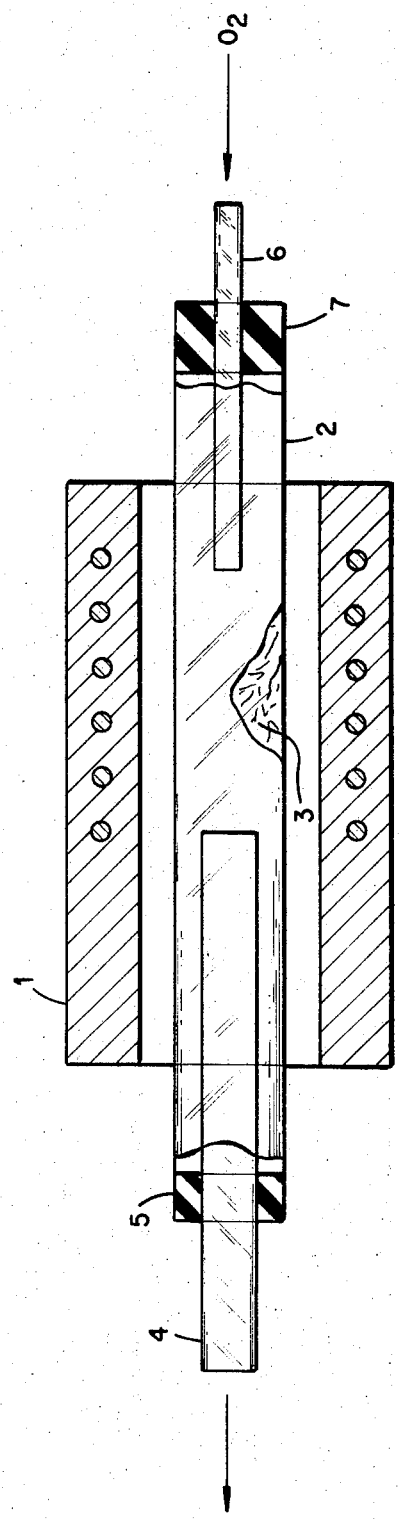

3,867,137

PURIFICATION OF IRIDIUM

BACKGROUND OF THE INVENTION

This invention was made in the course of, or under, a contract with the United States Atomic Energy Commission. It relates generally to a process for purifying iridium.

Radioisotope fuels have found considerable use both as terrestrial and space power sources. Such fuels utilize an isotope which is an alpha, beta, or gamma emitter. Heat is produced by stopping these nuclear emissions and converted into electricity by means of thermoelectric generators or thermionic converters.

The most prominent radioisotope fuels at present are $^{238}PuO_2$ and $^{244}Cm_2O_3$. As is disclosed in commonly assigned copending application Ser. No. 226,500, the isotopic fuels are formed into pellets and encapsulated. The encapsulation material for such fuels must be highly reliable from the standpoint of compatibility with the heat source environment and from the standpoint of being able to withstand launch abort situations, re-entry conditions and high velocity impact.

One material being considered for encapsulating the isotopic fuels is iridium. However, it was found that iridium having a purity of about 99.8 wt. percent was necessary in order to produce a product with reproducible and acceptable properties and to prevent adverse reactions between the isotopic power source, the heat source environment and the capsule. Iridium, however, is usually available with a purity of only about 97 to 99 wt. percent. The contaminants normally comprise other noble metals and detrimental elements such as aluminum, silicon, and iron.

In addition to the present need for high purity iridium, a need also exists for a process of reclaiming scrap iridium. Iridium is relatively scarce and highly expensive. A process for making contaminated iridium reusable is thus highly desirable.

SUMMARY OF THE INVENTION

It is thus an object of this invention to provide a process for purifying and reclaiming iridium.

It is a further object of this invention to provide a process of producing iridium with a purity of 99.8 wt. percent or greater.

These as well as other objects are accomplished by oxidizing impure iridium to form volatile $IrO_3$, condensing the $IrO_3$ as $IrO_2$, and reducing the $IrO_2$ to form highly pure iridium metal.

BRIEF DESCRIPTION OF THE DRAWING

The single FIGURE of drawing schematically illustrates an apparatus used in the process of this invention.

DETAILED DESCRIPTION

According to this invention iridium is provided with a purity of about 99.8 wt. percent. The process generally comprises removing iridium from impure iridium by placing the impure iridium in an oxidizing environment to form volatile $IrO_3$, condensing $IrO_2$ from the $IrO_3$ at a point away from the impure iridium and reducing the $IrO_2$ back to substantially pure iridium metal.

The oxidization step of the process FIGURE this invention is best understood by referring to the figure of drawing. The reaction is carried out within a tube furnace (1) having an outer fused silica tube (2), containing impure iridium metal (3). An inner fused silica tube (4) is attached to tube (2) by means of stopper (5). A source of oxygen (6) passes through stopper (7) at the opposite side of tube (2) from tube (4).

In actual operation, impure iridium (3) is maintained at a temperature of between 1,000° and 1,200°C. Within this temperature range iridium will react with oxygen from source (6) to form volatile $IrO_3$. A temperature of about 1100°C is preferred because the impure iridium begins to sinter at higher temperatures. Due to the flow of oxygen through source (6), the volatile $IrO_3$ is forced into tube (4). $IrO_3$ is unstable and decomposes at temperatures below about 1,000°C to form solid $IrO_2$ and $O_2$. The decomposition occurs within tube (4) to leave $IrO_2$ deposited therein. By this process, non-volatile impurities remain with the impure iridium (3) and volatile impurities pass out through tube (4) or are codeposited with the $IrO_2$.

As a precautionary step, the resulting acid-insoluble $IrO_2$ is washed with aqua regia after it is collected in tube (4) to dissolve any soluble impurities therein. After washing, the $IrO_2$ is reduced to iridium metal by heating from about 500° to 800°C in a reducing atmosphere, such as CO or $H_2$.

Having generally described the invention, the following example is given as a further illustration thereof.

EXAMPLE

Samples of typically available iridium metal, in amounts of about 10 g, were crushed or sheared to pieces ¼ inch or less and placed in the bottom of tube (2) Tube (4) was passed through stopper (5) and terminated near the surface of the iridium. The composite unit was placed in furnace (1) and heated to about 1100°C. Oxygen was introduced into tube (2) at a rate of about 1820 cc/min. whereby excess oxygen plus the iridium oxide passed into tube (4). Black $IrO_2$ crystals deposited on the walls of tube (4) at a region where the temperature was less than about 1,000°C. The rate of the reaction was about 0.1 g/hr. This rate is a function of amount of material, surface area, gas flow rate, and temperature.

After about 48 hours, the reaction produced about 5 grams of $IrO_2$, tube (4) was removed and one end capped. The $IrO_2$ was treated with a 48 percent HF-$H_2O$ solution which caused the crystals to be removed from the walls of the tube and drop to the end. Thereafter, the crystals were crushed to a powder, digested in aqua regia, washed with distilled $H_2O$ and dried. The $IrO_2$ was heated to 600°C while flowing in argon-4 percent hydrogen at about 1,000 cc per minute.

The attached table lists three tests of the subject method utilizing the conditions set forth in the above example. Lot 1 is an alloy in which it was desired to remove the niobium and reclaim the iridium. Lot 2 is a sample of a commercially-available product containing certain impurities having concentrations greater than 100 ppm. Lot 3 was an especially prepared alloy whereby a large number of impurities were present in quantities above 100 ppm. It may be seen that the subject method, in all cases, produces iridium metal of about 99.98 percent or higher purity with no individual contaminant exceeding 100 ppm (generally below 50 ppm). Although some impurities were lower when a temperature of 1,000°C was utilized (lot 2), the rate of reaction was about 5 times slower due to the lower pressure of $IrO_3(g)$ over $IrO_2(s)$.

TABLE

| Element[a] | Lot 1 | | Lot 2 | | | Lot 3 | |
|---|---|---|---|---|---|---|---|
| | Before | After[b] | Before | After[b] | After[c] | Before[d] | After[b] |
| Al | 4 | 15 | 4 | 1 | 1 | 300 | 4 |
| B | 0.1 | 0.2 | 0.6 | 0.1 | 0.2 | 0.5 | 0.3 |
| Ca | 6 | 60 | 0.6 | 0.6 | 6 | 60 | 6 |
| Co | e | e | e | e | e | 195 | 0.3 |
| Cr | 1 | 8 | 3 | 0.2 | 0.2 | 200 | 2 |
| Cu | 2 | 0.5 | 5 | 5 | 5 | 10 | 4 |
| Fe | 3 | 10 | 30 | 8 | 2 | 550 | 8 |
| Hf | e | e | 300 | e | e | 300 | 1 |
| Mo | 5 | 5 | 1500 | 60 | 6 | 500 | 6 |
| Na | 0.3 | 0.4 | 0.4 | 0.3 | 0.3 | 1 | 0.3 |
| Nb | ~30,000 | 15 | e | e | e | 200 | 0.1 |
| Ni | 1 | 1.5 | 0.5 | 0.1 | 0.1 | 260 | 0.4 |
| P | 0.5 | 0.2 | 2 | 0.1 | 0.4 | 2 | 0.2 |
| Pd | 2 | <0.6 | 2 | 0.6 | 0.6 | 500 | 0.6 |
| Pt | 1 | 40 | >10,000 | 30 | 10 | 2160 | 30 |
| Rh | 5 | 5 | 500 | 0.4 | 0.4 | 870 | 0.1 |
| Re | e | e | 90 | 5 | 0.5 | 2200 | 15 |
| Ru | 5 | 5 | 50 | 7 | 2 | 5 | 0.4 |
| Si | 3 | 9 | 9 | 2 | 2 | 300 | 0.8 |
| Ta | 3 | 1 | 30 | e | e | 600 | 25 |
| Ti | 5 | 3 | e | 0.2 | 0.2 | 7 | 0.2 |
| V | 0.8 | 0.3 | 3 | 0.1 | 0.1 | 150 | 9.7 |
| W | 10 | 10 | 900 | 25 | 2.5 | 2700 | 3 |
| Zn | e | e | e | e | e | 0.3 | 0.3 |
| Zr | 3 | <0.3 | 100 | 0.3 | 3 | 300 | 0.3 |
| S | 4 | 40 | 40 | 3 | 10 | 1 | 10 |
| Th | 0.4 | 0.4 | 4 | e | e | e | e |
| Ir, % | ~97.0 | 99.976 | ~98.640 | 99.986 | 99.995 | 98.763 | 99.988 |

[a] Analyses shown in weight per million
[b] Oxidized at 1100°C
[c] Oxidized at 1000°C
[d] Nominal composition
[e] Not detected The purified iridium powder thus formed by the process of this invention can be formed into useful shapes by conventional metallurgical techniques such as pressing and sintering, then electron beam melting and drop casting. Vacuum sintering at about 1,500°C using carbon heater elements and heat shields and electron beam melting is the preferred consolidation method to avoid recontamination of the iridium with metallic impurities.

While the process of this invention has been described as being applicable to iridium with a starting purity of 97 to 99 wt. percent, such as that which is commercially available, it is generally applicable to iridium with a purity level as low as about 90 percent and conceivably can be used to recover iridium traces (e.g., about 10 percent) as long as the iridium is in an oxidizable form.

What is claimed is:

1. A method for purifying iridium comprising the steps of oxidizing impure iridium to form volatile $IrO_3$, decomposing the $IrO_3$ to condense $IrO_2$ as a solid at a point away from said oxidizing step, and reducing the $IrO_2$ to iridium metal.

2. The method according to claim 1 comprising the further step of washing said $IrO_2$ with aqua regia prior to said step of reducing.

3. The method according to claim 1 wherein said step of oxidizing is carried out at a temperature of 1000° to 1200°C.

4. The method according to claim 3 wherein said temperature is 1100°C.

5. The method according to claim 1 wherein said step of reducing comprises heating said $IrO_2$ to 500° to 800°C in a reducing atmosphere.

6. The method according to claim 5 wherein said reducing atmosphere is hydrogen.

7. The method according to claim 1 wherein said impure iridium has a purity of about 90 wt. percent.

8. The method according to claim 1 wherein the purified iridium has a purity of at least 99.8 wt. percent.

* * * * *